United States Patent
Autermann

[11] Patent Number: 6,122,580
[45] Date of Patent: Sep. 19, 2000

[54] APPARATUS AND METHOD FOR DRIVER-SPECIFIC SETTING ON VEHICLE DEVICES

[75] Inventor: Ludger Autermann, Drensteinfurt, Germany

[73] Assignee: CLAAS Kommanditgesellschaft auf Aktien, Harsewinkel, Germany

[21] Appl. No.: 09/053,736

[22] Filed: Apr. 2, 1998

[30] Foreign Application Priority Data

Apr. 9, 1997 [DE] Germany .......................... 197 14 556

[51] Int. Cl.[7] ................................. G06F 7/04
[52] U.S. Cl. ..................... 701/49; 701/35; 340/828.5
[58] Field of Search .................... 701/49, 29, 33, 701/35; 307/10.2, 10.3; 340/825.06, 825.15, 825.36, 825.5, 825.54, 825.31

[56] References Cited

U.S. PATENT DOCUMENTS

| | | | |
|---|---|---|---|
| 4,072,850 | 2/1978 | McGlynn ................................ | 701/35 |
| 5,229,648 | 7/1993 | Sues et al. .............................. | 307/10.2 |
| 5,334,974 | 8/1994 | Simms et al. .......................... | 340/990 |
| 5,712,512 | 1/1998 | Ostermann et al. ................... | 307/10.2 |
| 5,798,576 | 8/1998 | Ostermann et al. ................... | 307/10.3 |
| 5,838,251 | 11/1998 | Brinkmeyer et al. ............. | 340/825.31 |
| 5,841,363 | 11/1998 | Jakob et al. ....................... | 340/825.31 |

FOREIGN PATENT DOCUMENTS

| | | |
|---|---|---|
| 37 29 941 | 3/1989 | Germany . |
| 38 17 495 | 11/1989 | Germany . |
| 41 23 666 | 7/1992 | Germany . |
| 42 38 301 | 5/1994 | Germany . |
| 43 40 289 | 6/1994 | Germany . |
| 44 09 046 | 9/1995 | Germany . |
| 195 30 719 | 2/1997 | Germany . |
| WO 84/03785 | 9/1984 | WIPO . |

OTHER PUBLICATIONS

Schrey, Ulrich et al., "Abschied vom Autoschlussel.", Siemens–Zeitschrift, Jan. 1996. S. 32–36.

*Primary Examiner*—Tan Nguyen
*Attorney, Agent, or Firm*—Browdy and Neimark

[57] ABSTRACT

An apparatus for driver-specific setting of vehicle devices (EG) has setting parameters stored as a setting-parameter data set (PS1–PSx) in a local processor (LP). Action signals (AS) are transmitted, via a control and/or regulating apparatus (R), to the devices (EG), from which sensor signals (SS) may be fed back into the control and/or regulating apparatus (R). The local processor (LP) reports the respective identifier (ID, ID1–IDx) and a vehicle identification (FK1–FKx) of the respectively used vehicle via a data radio link (FG, FZ) to a central processor (ZP), which enters them into a key-use register (BR) and stores the respectively associated setting-parameter set (PS1–PSx) and possibly other useful data as operating information (BM). This keeps them ready for an evaluation.

16 Claims, 1 Drawing Sheet

APPARATUS AND METHOD FOR DRIVER-SPECIFIC SETTING ON VEHICLE DEVICES

FIELD OF THE INVENTION

The present invention relates to an apparatus and method for adjusting mirrors, seat positions, steering columns, and other driver-specific devices.

REVIEW OF THE RELATED TECHNOLOGY

An automatic device-setting apparatus is known from German patent DE 43 40 289 A. In this apparatus parameter values and limit values of vehicle devices, such as seat and mirror adjustments, springiness of seats, motor-operating data, and gear settings, are stored in internal memories of the control computer. The values are selected and put to use according to the identification of the user, which is ascertained with a data-carrier card. For each authorized driver, corresponding operating parameters are stored and retained for future use. Diagnosis data determined by the local control computer are transmitted to a service center by a communication system, for example a radio phone, and error information derived from the diagnosis data is fed back to the local processor and displayed for the driver.

This apparatus does not provide continuous monitoring of the operating parameters and operating data, nor central registration and evaluation, nor central enabling or blocking of the vehicle for authorized or non-authorized users of the vehicle.

SUMMARY OF THE INVENTION

It is the object of the invention to simplify the operation and expand the functions of the apparatus mentioned above.

The object is accomplished in that the local processor respectively reports the identifier (user identification) and the identification of the used vehicle to a central processor via data radio data link. The processor enters the identifier and the vehicle identification into a key-use register and stores the setting-parameters associated with the user and vehicle (and optionally other use-relevant data such as operating information) and keeps them ready for an evaluation.

The invention links and combines different function complexes of the vehicle and/or operating equipment. Each driver of a fleet of vehicles has a key or key card bearing a personal identification (identifier). When the driver attempts to open any vehicle of the fleet with this key authorization to open or start the vehicle is checked; if the identification is valid, the vehicle can be opened. Other designated functions, e.g. starting the engine or operating a computer, can be validated in exactly the same manner.

In addition, the central processor retrieves setting data and operating parameters of the vehicle and/or equipment which are personal to the user, and activates the different settings, and (if the user is authorized) the operating functions are enabled.

Furthermore, when the key or key card is used the identifier (user identification) from the user key or card is registered in the memory of the apparatus at the same time. These registration entries may be supplemented by data relevant to accounting, such as times of use by the individual user.

Individual function complexes can be embodied accordingly to the number and license class (or classes) of the drivers, the number and type of vehicles and equipment, the centralized or decentralized organization of the fleet, and the fixed or arbitrary association of the drivers with the vehicles.

In a first embodiment the key embodies, in addition to the personal identifier of the user, an individual vehicle identification, in the manner of a system key, e.g. an individual (primary) key identification or an identification of a group to which the individual key belongs (group key identification).

The key can unlock by a mechanical locking mechanism or by an electrical or opto-electronic decoder lock, or both. However, the personal identifier is transmitted from the key to the vehicle by electrical contact, opto-electronically, or by radio.

In a further embodiment, the authorization of the individual key is checked in the vehicle through a comparison with a table stored in the vehicle, or through a radio query in a central authorization register, before opening or operation is enabled.

If a vehicle has a plurality of locks, for example a driver's-cab lock, an ignition lock, a fuel-tank lock, etc., the personal key can have separate authorizations. On the other hand, the individual bolts of associated secondary locks can be operated by a lock or individual locks to be actuated with one key, depending on the authorizations. In this way, it is possible, for example, to enable a driver without a heavy-equipment license only to drive, or to allow a mechanic who has no permission to drive only to perform maintenance work.

Individual authorization is advantageously associated with a central registration of the use of the vehicle and the authorizations of the identified drivers or users. In this system, when the apparatus is locked or shut down by the key, preferably the authorization is canceled. Registration and cancellation of the driver and vehicle preferably are also used in central fleet management.

If a function such as unlocking or use of the vehicle use is enabled then a set of personal setting parameters (and optionally operating parameters) which are specific to the user are activated. In a first embodiment this set of personal setting parameters is stored in the key, which is adapted to store information and to provide its encoded information to the vehicle during use of the key, preferably without wires or contacts, e.g. optoelectronically.

In addition to known types of encoded vehicle keys, a contactless data-transmission chip card (key card) can also be used in the present invention. Such a chip card is well suited for writing information back into the system, for example, accounting or debiting information.

In a second embodiment, the set of personal setting parameters is stored in a local processor on the vehicle; this is fairly simple if a driver only drives a small, specific group of vehicles. The setting values contained in the vehicle can be changed easily in continuous operation, and can then be stored as new, individual parameters for future use.

In a third embodiment, the individual setting parameters are stored in a central location. The set of parameters is transmitted to the vehicle by radio, along with the authorization data, as soon as the personal identifier arrives from the vehicle. (The vehicle sends the key identifier to the central facility via radio.) This method permits the greatest freedom in associating each driver with each vehicle using a very simple key that needs to contain essentially only the personal identifier.

The central operating processor can simplify the lock system operation by providing personal codes in parallel to the key identifier code. If the central computer inquires about the enabling functions by radio, the user can issue a request for enabling and blocking from a local machine terminal or a separate, portable radio device. This function corresponds to a personal numerical lock, e.g. a combination lock.

The lock-release function can be advantageously supplemented by known, independent safety functions that prevent release or that trigger interlocks, alarms, or the like in the event of unauthorized key use.

The present invention is applicable to all individually-settable functions and devices of a vehicle including the mirror, seat, head rest, steering column and seat belt position adjusters. Numerous other settings of vehicle and operating parameters can be effected in modern, computer-controlled agricultural machines, construction machines, equipment or the like, which include computer-supported operating stand.

According to the invention, these settings are stored as an individual data set associated with the identifier of the driver. The association is pre-selected or can be made at the conclusion of use, so they can be retrieved directly and be available for later use.

Other devices which can be set by the present invention include the driver's cab, temperature regulators of the heating and air-conditioning systems, the radio receiver and/or transmitter channel and volume selection, driving strategy, maximum speed, motor setting, and economy parameters. All these can be stored in the personal setting-parameter set, and automatically reactivated when the user next uses a vehicle or machine. This saves valuable set-up time and ensures that no errors occur in the machine settings when a new driver takes over the machine after another driver or after maintenance have changed the parameters or settings.

The function center preferably obtains all the following information: who has operated the lock, where, and when. The corresponding data are collected in the vehicle and transmitted to the center by radio.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

Figure 1:
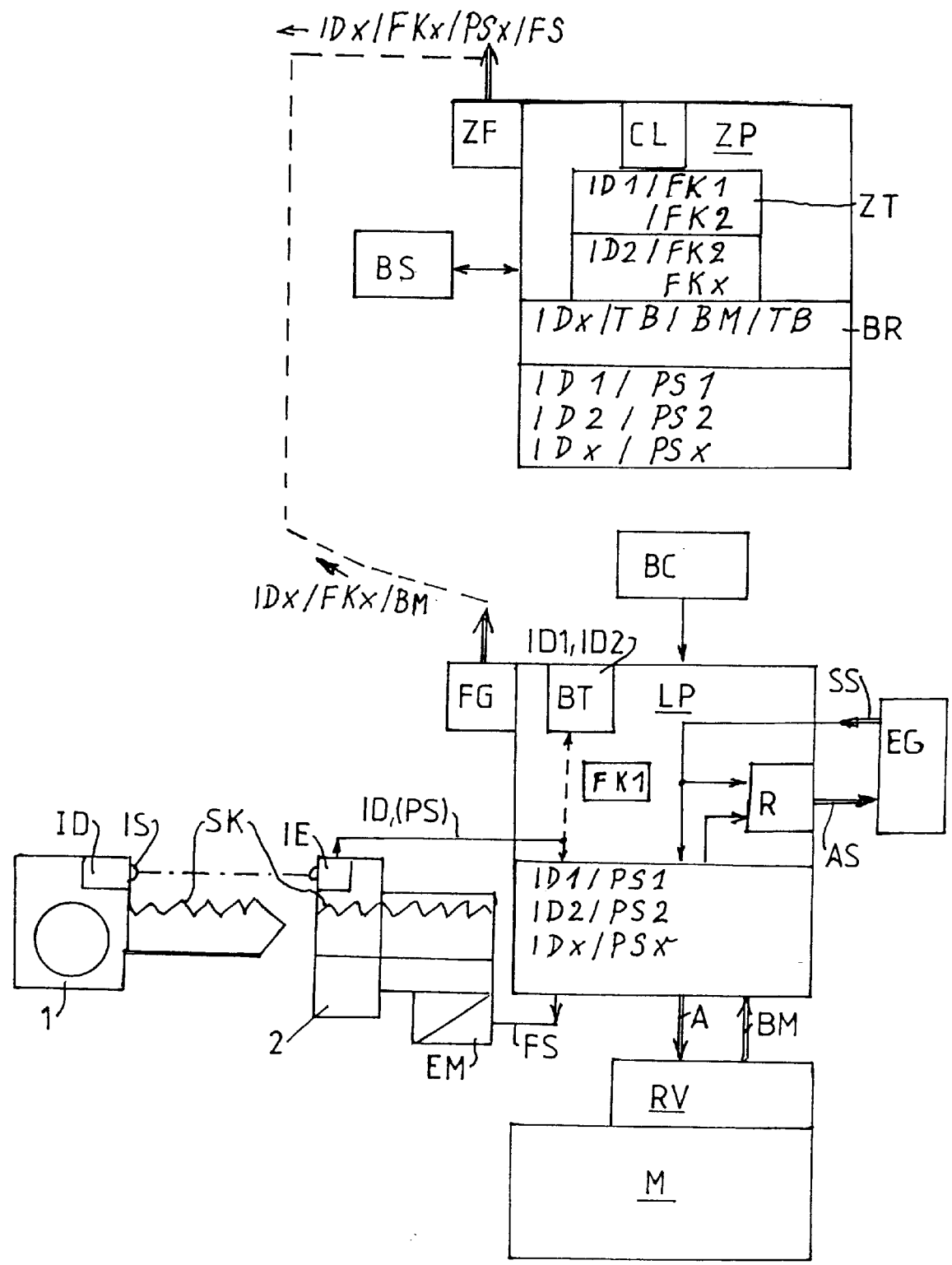
FIG. 1 is a schematic view of the invention.

Here, and in the following claims, "key" means any encoded device such as a mechanical key (e.g., with teeth, prongs, etc), a magnetic key such as a strip key or a credit-card type card with a magnetic strip on one side, an optical device output a specific pattern of light, holographic devices, optical patterns (for example, bar codes), electronic devices (e.g., digital signal outputters), optical devices (for example, remote-control devices using infrared), or any other device which encodes information that can be read or utilized for unlocking or enabling.

Referring to the drawing figure, the key 1 is encoded with an identifier ID, which is transmitted, for example by an electrooptical transmitter IS, to a receiver IE in the lock 2 when the key is used. In addition, the key 1 can bear a mechanical key identification SK (e.g., tooth profile), which cooperates with the lock 2 for mechanical locking and unlocking. The lock 2 acts as a decoder for the information on the key 1, in whatever form the information is stored.

If the lock is operated mechanically, the key's identifier ID code may be determined by the lock 2, based on the identification profile of the key 1, and SK is transmitted from the lock 2 to a local processor LP. That is, the key profile may act mechanically to disengage the lock 2 and at the same time encode the identifier ID code. They key profile can of course identify the key 1 uniquely, and so indirectly identify the user who has the key 1.

If electronic locking-enabling is used, then preferably at least one encoded vehicle identification FK1, FK2, FKx is transmitted from the key to the receiver IE along with the identifier ID, and thence into the local processor LP. (The PK codes correspond to the vehicles, systems, or machines which the key owner is authorized to operate.) The processor LP compares the vehicle identifications FKn stored there to the set of FK identifications from the key 1; it also compares the user's ID to a set ID1, ID2, IDx. If these match, the processor LP retrieves from its memory an associated personal data set PS1, PS2, PSx addressed (indexed) by the particular identifier ID1, ID2, IDx which matches the ID of the key 1.

In a different embodiment, instead of the key 1 storing the identifications FK of the vehicles associated with the driver, the identifiers ID1–IDx of the authorized individual are stored in an authorization table BT in the local processor LP, so only the identifier is checked.

The personal data set PS1, PS2, PSx is converted into action signals AS and sent to vehicle or machine devices EG by a controller or regulator R. The device EG may optionally send feedback signals SS to the regulator R. The feedback signals SS may also optionally feed back to the stored data sets PS1, PS2, . . . in the local processor LP. This permits any adjustments made by the user to be stored as parameter setting updates.

At least one action signal A is transmitted to the regulating apparatus RV of the machine M as a nominal presetting. It may also be transmitted to the vehicle aggregate that may supply operating information BM.

The local processor LP is connected to an operating panel BC, from which the individual settings, new nominal pre-settings for action signals AS, or operation actions A are received and stored directly in the personal data set PS1, PS2–PSx, or, in association with operating instructions for the respectively activated user identifier codes ID1, ID2–IDx.

One embodiment of the system provides storage of the identifier and associated personal data set ID1/PS1; ID2/PS2; IDx/PSx, disbursed by radio from a central processor ZP. This occurs either at the conclusion of vehicle use by a key holder, or as a standard operation, or based on instructions from the key holder. The radio link between the a mobile data radio FG and the central processor radio FZ is used for sending the user's identifier ID to the central processor ZP and is re-used when the lock is operated again for transmitting the associated personal data set PSx back into the local processor by calling with the correct identifier IDx.

In an embodiment in which the authorized identifiers IDI–IDx are not stored in the local processor LP, but are stored only in the central processor ZP, during key use the respective vehicle identification FKx and the respective identifier IDx of the key 1 are transmitted by radio to the central processor ZP, and the authorization of the identifier is ascertained through comparison in an authorization-association table ZT. If the authorization is valid, the central processor ZP transmits back to the local processor LP an enabling signal FS, the respective identifier IDx, and the associated personal data set PSx. Thereupon the processor effects the appropriate actions and may transmit the enabling signal FS to an unlocking magnet EM.

An operating station BS (e.g, a keypad) at the central processor ZP permits the entry of authorizations into the authorization-association table ZT and the checking of the contents of the stored data sets PS1–PSx, as well as new entries. A clock CL is used to record respective key operations and associated vehicle identifications FKx at their respective times of use TB. Radio-transmitted operating information BM associated with the vehicle identification FKx are optionally also stored and are kept ready for further evaluation.

Examples of accounting data registered at the end of vehicle and equipment use include, for example, set-up times, operating times, crop yield, the extent and type of surface processing, and consumption of operating materials.

In the event that several persons are involved in the work process of a working machine, their authorization and the fact that they are present and working in parallel can, of course, also be registered and enabled by key identifiers ID.

The processor (i.e. computer or microprocessor) functions and operations of the present invention may be carried out by suitable software, by hard-wired circuitry, dedicated devices, or any other means. These functions include, but are not limited to, tabulating and retrieving from memory data such as parameters and associated or correlated values, transforming signals from one mode to another (e.g., transforming digital messages from the processors into radio signals which might be spreadspectrum, AM, FM, or some other digital format), inputting and outputting (e.g. from the operating panel PC or the regulator R), transmitting data from the key to the decoder/lock 2, and so on.

It is within the capabilities of one skilled in the art to use the different embodiments in combination, or with program-controlled selection.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. An apparatus for driver-specific setting of vehicle devices (EG) of a vehicle having a specific vehicle identification (FX), comprising:

a key (1) encoded with a specific personal identifier (ID);

a key decoder (2) coupled to a local processor (LP) to send the personal identifier to the local processor;

the local processor further comprising a local memory storing an identifier (ID1–IDx) and respective corresponding setting-parameter data sets (PS1–PSx);

a control/regulating apparatus (R), coupled to local the processor and at least one device (EG), sending an action signal translating a one of the setting-parameter data (PS1–PSx), corresponding in the memory to the specific personal identifier (ID) encoded on the key (1), to the device (EG);

the device (EG) comprising sensors feeding back sensor signal (SS) to local processor (LP) through control/regulating apparatus (R);

a central processor (ZP) comprising a central memory and coupled to the local processor (LP) by a data radio link (FG, FZ);

wherein the local processor (LP) reports the specific identifier (ID) and the specific vehicle identification (FK) to the central processor (ZP) via the data radio link (FG, FZ), and wherein the central processor enters the specific identifier (ID) and the specific vehicle identification (FK) into a key-use register (BR) of the central memory and stores the one of the setting-parameter data sets (PS1–PSx), corresponding in the memory of the specific personal identifier (ID) encoded on the key (1), in another portion of the central memory;

whereby the setting-parameter data sets (PS1–PSx) are kept ready for an evaluation;

wherein the central processor (ZP) is coupled to an operating station (BS) whereby the association table (ZT) is modified and wherein;

the central processor (ZP) is used to access the use register (BR) for evaluations and modifications;

wherein the local processor (LP) includes at least one action output (A) to an operation-control apparatus (RV) of the vehicle and a machine (M) connected thereto, which operation-control apparatus feeds back at least one bit of operating information (BM) to the local processor (LP), and wherein;

the action output (A) is controlled by the contents of a respectively activated one of the setting-parameter data sets (PS1–PSx).

2. The apparatus according to claim 1, wherein operating information (BM) is stored in the central memory.

3. The apparatus according to claim 2, wherein the identifier (ID, ID1–IDx) is checked against at least one of an authorization table (BT) including lock-release data and an association table (ZT) of vehicle identifiers (ID1–IDx), for associated, authorized vehicle identifications (FK1–FKx), and wherein the associated lock-release data and settingparameter data set (PS1–PSx) are respectively activated in the event of authorization.

4. The apparatus according to claim 4, wherein the local processor (LP) transmits an enabling signal (FS) to a controllable function element, once an authorization and a scope thereof are determined.

5. The apparatus according to claim 4, wherein the controllable function element includes at least one local lock-release magnet (EM).

6. The apparatus according to claim 1, wherein an association table (ZT), comprising vehicle identifications (FK1–FKx) and respectively authorized vehicle identifications (ID1–IDx), is stored in the central processor (ZP), and wherein the associated setting-parameter set (PS1–PSx) is only enabled, in the local processor (LP) by the data radio link (FG, FZ), if the specific identifier and the specific vehicle identification are in the association table (ZT).

7. The apparatus according to claim 1, wherein the local processor (LP) is coupled to an operating panel (BC), with input signals therefrom modifying the settingparameter data sets (PS1–PSx) as a function of an operation-mode setting.

8. The apparatus according to claim 1, wherein the local processor (LP) is coupled to an operating panel (BC), with input signals therefrom modifying including lock-release data stored in an authorization table (BT) as a function of an operation-mode setting.

9. The apparatus according to claim 1, wherein at least one of the operating information (BM) and sensor signals (SS) reported by the device (EG) is entered into the setting-parameter set (PS1–PSx).

10. The apparatus according to claim 1, wherein at least one of the operating information (BM) and sensor signals (SS) reported by the device (EG) is entered into an authorization table (BT) including lock-release data.

11. The apparatus according to claim 1, wherein the key (1) bears a mechanical key identification (SK), wherein the key decoder (2) comprises a lock, and wherein the key fits the lock.

12. The apparatus according to claim 11, wherein the key identification (SK) is a key system identification of a primary, group, or individual key system.

13. The apparatus according to claim 1, wherein the specific identifier (ID) is stored in electronically-encoded form in the key (1) and is transmitted via an electrical contact, wireless signal, or opto-electronic coupler (IS–IE), from the key (1) into the key decoder (2), the key decoder comprising a receiver, and wherein the specific identifier (ID) is entered from the key decoder into the local processor (LP).

14. An apparatus for driver-specific setting of vehicle devices (EG) of a vehicle having a specific vehicle identification (FX), comprising:

a key (1) encoded with a specific personal identifier (ID);

a key decoder (2) coupled to a local processor (LP) to send the personal identifier to the local processor;

the local processor further comprising a local memory storing an identifier (ID1–IDx) and respective corresponding setting-parameter data sets (PS1–PSx);

a control/regulating apparatus (R), coupled to local the processor and at least one device (EG), sending an action signal translating a one of the setting-parameter data (PS1–PSx), corresponding in the memory to the specific personal identifier (ID) encoded on the key (1), to the device (EG);

the device (EG) comprising sensors feeding back sensor signal (SS) to local processor (LP) through control/regulating apparatus (R);

a central processor (ZP) comprising a central memory and coupled to the local processor (LP) by a data radio link (FG, FZ);

wherein the local processor (LP) reports the specific identifier (ID) and the specific vehicle identification (FK) to the central processor (ZP) via the data radio link (FG, FZ), and wherein the central processor enters the specific identifier (ID) and the specific vehicle identification (FK) into a key-use register (BR) of the central memory and stores the one of the setting-parameter data sets (PS1–PSx), corresponding in the memory of the specific personal identifier (ID) encoded on the key (1), in another portion of the central memory;

whereby the setting-parameter data sets (PS1–PSx) are kept ready for an evaluation;

wherein the central processor (ZP) is coupled to an operating station (BS) whereby the association table (ZT) is modified and wherein;

the central processor (ZP) is used to access the use register (BR) for evaluations and modifications;

wherein the local processor (LP) includes at least one action output (A) to an operation-control apparatus (RV) of the vehicle and a machine (M) connected thereto, which operation-control apparatus feeds back at least one bit of operation information (BM) to the local processor (LP), and wherein;

the action output (A) controls at least one of a maximum speed, maximum and minimum switching rpm, economy-state gear-operation presettings and motor settings, a use time, set-up times, operation times, operating-material consumptions, or work-surface sizes, and crop yields, and wherein these are continuously registered as the operating information (BM), and are transmitted by radio continuously, or when the key is involved in a closing procedure, to the central processor (ZP) for further evaluation and accounting procedures, whereby they are kept ready.

15. The apparatus according to claim 14, wherein operating information (BM) is stored in the central memory.

16. The apparatus according to claim 14, wherein an association table (ZT), comprising vehicle identification (FK1–FKx) and respectively authorized vehicle identifications (ID1–IDx), is stored in the central processor (ZP), and wherein the associated setting-parameter set (PS1–PSx) is only enabled, in the local processor (LP) by the data radio link (FG, FZ), if the specific identifier and the specific vehicle identification are the association table (ZT).

* * * * *